No. 854,867. PATENTED MAY 28, 1907.
F. R. BAKER.
ANIMAL TRAP.
APPLICATION FILED SEPT. 4, 1906.
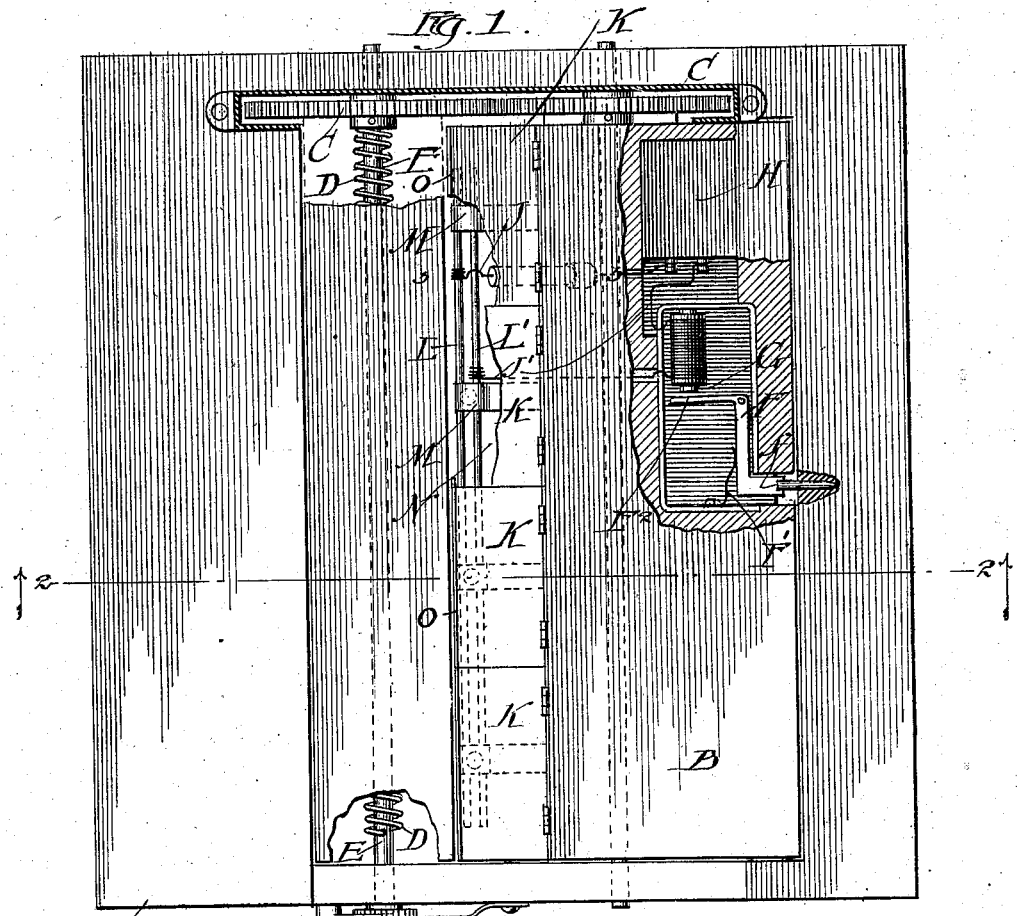
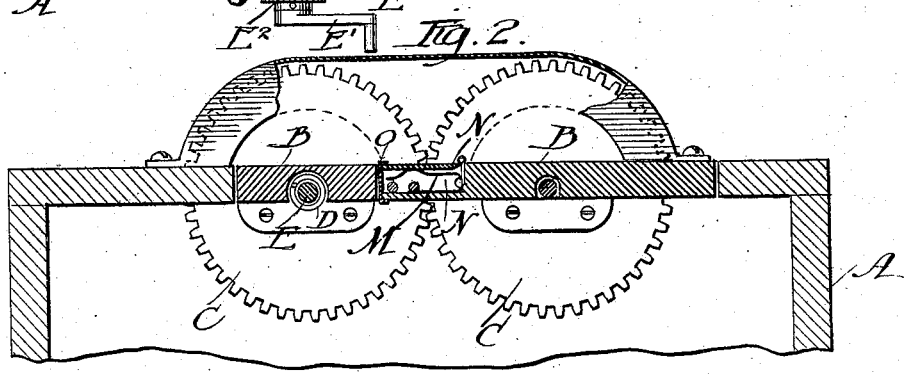
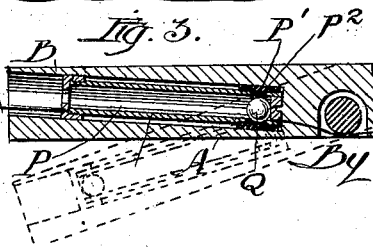

UNITED STATES PATENT OFFICE.

FRED R. BAKER, OF CHICAGO, ILLINOIS.

ANIMAL-TRAP.

No. 854,867.        Specification of Letters Patent.        Patented May 28, 1907.

Application filed September 4, 1906. Serial No. 333,063.

*To all whom it may concern:*

Be it known that I, FRED R. BAKER, a citizen of the United States, residing at Chicago, in the county of Cook and State of Illinois, have invented new and useful Improvements in Animal-Traps, of which the following is a specification, reference being had to the accompanying drawings, forming a part thereof.

The purpose of this invention is to provide an improved trap for catching alive small animals and vermin of every sort, particularly adapted to be operative for such purpose in case of very light and small animals.

It consists of the features of construction shown and described in the drawings and specifications and set out in the claims.

In the drawings:—Figure 1 is a plan view with portions of the trap doors broken away to show the mechanism. Fig. 2 is a section at the line 2—2 on Fig. 1. Fig. 3 is a detail section at the line 3—3 on Fig. 1.

The device comprises the cell or imprisoning box, A, having in the upper side two trap doors, B, B, pivoted for rocking over horizontal axes which are parallel. These trap doors are geared together, each having secured to it a gear, C, said gears intermeshing so that the two trap doors rock about their axes in opposite directions, both descending at the same time at their proximate edges to open the mouth of the cell and drop into it the animal whose presence on the trap doors cause such opening. It is not intended that the rocking of the trap doors shall be dependent upon the weight of the animal. On the contrary, a motor device for rocking them is provided. A simple form of such device consists of a spring, D, coiled about the shaft, E, of one of the doors, having one end fast in said shaft and the other end connected with the gear, C, which, being made fast to the trap door, gives the spring operative connection with the trap door. The spring is coiled by a crank handle, $E^1$, on the shaft, E, outside the cell, a ratchet disk, $E^2$, on the shaft being engaged by a pawl, $E^3$, to retain the shaft against reverse rotation, and so hold the tension of the spring which unwinds by rotation of the opposite end about the shaft, rotating thereby the gear and trap door. The two doors are held normally locked at horizontal position,—which is the closed position,—by means of a catch dog, F, mounted on one of the doors engaging a pin, $f$, projecting from the margin of the aperture in the top wall of the cell which is closed by the doors, the dog engaging under the pin and so preventing the trap door from rocking upward at the outer edge and downward at the inner edge, this being the direction in which the motor spring tends to rotate it. A spring, $F^1$, presses the dog in direction for engagement with the pin. For releasing the dog, there is employed an electromagnet, G, mounted preferably, though not necessarily, in the door on which the dog is mounted, operating when energized to attract the arm, $F^2$, of the dog, F, and disengage the dog from the pin.

The magnet is energized by a cell or battery, H, which may also be mounted, as shown, in the door, B, the circuit in which the battery cell and electro magnet are contained comprising a circuit-closing device adapted to be operated for closing the circuit by a very light weight or pressure upon one of its elements in a position where it cannot be avoided by the animal to be trapped in crossing the trap (the trap being either located in an accustomed path of travel of the animals or in a path leading to a suitable bait.) From one pole of the battery, a conducting wire, J, extends to a rod or wire, L, lodged in the edge of the trap door, B, and extending substantially parallel to that edge and through nearly the whole length of the door. From the other pole of the battery, the wire, $J^1$, runs to the electro magnet, G, and thence to another wire, $L^1$, parallel with the wire, L, and in similar position in the trap door, B. Any contact piece that touches both the wires, L and $L^1$, will close the circuit. A number of such contact pieces, M, are provided, consisting of light springs extending across the two wires and normally in contact with the inner one, $L^1$, requiring very slight movement to depress any one of them into contact with the other wire, L. Both the rods or wires, L and $L^1$, and the contact piece springs, M, are mounted in a cavity formed by rabbeting out the door, B, at the upper side and at the edge proximate to the other door, and the chamber, N, thus formed is closed at the upper side by a plurality of hinged trip pieces, K, K, K, arranged end to end, and together constituting a complete closure for the upper side of the chamber, N. The contact springs, M, are desirably formed so that they each support the corresponding trip piece, K, holding it up flush with the surface of the doors. To prevent these trip pieces from being thrown up too far and becoming thereby liable to catch in the rotation of the door, there may be provided a thin channel bar, O, which closes the chamber, N, at the edge of the door, and by its upper horizontal lip makes a stop for the trip pieces, K. With this construction, it will be seen that any animal treading upon any one or more of the pieces, K, depressing it enough to bring the contact spring, M, down on to the wire, L, will thereby cause the circuit to be closed through the electro magnet, energizing the latter, causing it to disengage the dog, F, from the pin, $f$, whereupon the motor spring, D, will operate to rotate the gears, C, C, and give each door one complete rotation and no more, because the circuit being broken as soon as the door in its rotation tips far enough to drop the animal from it and let the trip piece, K, return to normal position, the dog, F, will be returned by its spring, $F^1$, to position for encountering the pin, $f$, before the door completes even half of its revolution, and the doors will thereby be stopped and locked at their original horizontal position. The sudden arresting of the rotary movement of the doors which will happen with this construction might cause the trip plates, K, or one of more or them, to be thrown down by their momentum, and thereby the circuit would be closed again and the dog released and another revolution occur which would again cause the third, and so on until the spring was run down. To prevent this result, I provide means for breaking the circuit independently of the return of the trip plate, K, to normal position after dropping the animal whose weight trapped it, and make such additional circuit-breaking means such that it will close slowly and not until an appreciable interval after the door regains horizontal position. Fig. 3 shows in detail this device, which consists of a short tube, P, lodged in the door, B, and constituting part of the circuit between the battery and the wire, L, the wire, J, being connected to the tube at both ends. This tube, P, is interrupted by being cut in two at $P^1$, the two parts being reconnected, so as to be rigid, by means of an insulating sleeve or junction piece, $P^2$, leaving a short interval between the two severed portions.

In the tube I place a small metal ball, Q, of suitable size to roll therein from one end to the other and to lodge at the rift between the two pieces of tube,—that is, in the gap which is covered and connected by the insulating coupling, $P^2$, and when thus lodged, the ball completes electric connection between the two severed portions of the tube. The tube is mounted in the door, B, inclined slightly so that the end near which the rift is formed and connected by the coupling, $P^2$, is lower than the other end, so that at normal horizontal closed position of the trap door the ball is lodged at the rift, as seen in Fig. 3, constituting electric connection between the two portions, so that the circuit can be completely closed for energizing the magnet by the depression of any one of the trip pieces, K, as described. As soon as the door has been released and tilts downward at the inner edge, the ball will roll to the other end of the tube, breaking the circuit at the rift which is closed by the coupling, $P^2$. As stated, this will occur by the action of gravity, but it will also occur by centrifugal tendency in the rotation of the door, and such centrifugal tendency will hold the ball at the further end of the tube while the door is completing its rotation, even though during the last half the ball would be at the higher end of the tube; and it will not leave that end until the door comes to rest and the centrifugal tendency ceases, and it will then roll down toward the lower end for closing the circuit again, occupying an appreciable interval of time in so doing; but during that time, the danger of shock, which may have caused the trip plates, K, to descend at their free edges and close the gap in the circuit which they control, will have ceased, and when the ball reaches the position at which it closes its gap, the other gaps will be open.

I consider the rocking or tilting movement of the trap doors the preferable one for opening the mouth of the trap, but I do not limit myself to such construction. The essential requirement is that the doors are given their opening movement by some motor device and are releasably locked at closed position, the locking device being released by an electro magnet which is energized in a circuit that is closed by the animal to be caught. In addition to these general requirements, the particular construction shown, including the rocking of the doors and the mounting of the parts, is preferred and specifically claimed.

I claim:—

1. An animal trap comprising a cell; a trap door for closing the same; motor means for operating the door for opening and closing; a catch for locking the door in closed position; an electro-magnet for releasing the catch, and an electric generator and circuit for energizing the magnet, comprising a circuit closer mounted on the trap door in position to be operated by the animal to be trapped.

2. An animal trap comprising a cell; a pair of trap doors therefor geared together; motor means for actuating the trap doors for opening and closing; a catch for locking them at closed position; an electro magnet for releasing the catch; an electric generator and circuit for energizing the magnet, and a circuit closer comprised in said circuit mounted on one of the trap doors in position to be operated by the animal to be trapped.

3. An animal trap comprising a cell; a pair of rocking trap doors therefor geared together; motor means for rocking them; a catch for locking them in closed position; an electro magnet for releasing the catch; an electric generator and circuit for energizing the magnet; a circuit closer in said circuit mounted on one of the trap doors in position to be operated by the animal to be trapped.

4. An animal trap comprising a cell; a pair of trap doors therefor mounted for rocking about parallel axes; intermeshing gears connecting said doors for rocking them in opposite directions and causing them to part by descending simultaneously at their meeting edges to open a gap between them into the cell; motor means for rocking them in direction for such opening; a catch for locking them at horizontal closed position; an electro magnet for releasing the catch; an electric generator and circuit for energizing the magnet, and a circuit closer mounted on one of the trap doors in position to be operated by the animal to be trapped.

5. An animal trap comprising a cell; a pair of trap doors having meeting edges, mounted for rocking about parallel axes and geared together for rocking in opposite directions to cause their meeting edges to part by descending simultaneously; a spring coiled about the shaft of one of the gears connected at one end to the shaft and at the other end to said gear; means outside the cell for rotating the shaft to coil the spring and for retaining it against reverse rotation; a catch for engaging one of the doors to lock them both at horizontal closed position; an electro magnet for releasing the catch; an electric generator and circuit for energizing the magnet, and a circuit closer in said circuit mounted upon one of the doors in position to be operated by the animal to be trapped.

6. An animal trap comprising a cell; a pair of trap doors therefor geared together; motor means for rocking them; a catch for locking them; an electro magnet for releasing the catch mounted on one of the doors; an electric generator and circuit for energizing the magnet, and a circuit closer comprised in said circuit mounted on the same door on which the magnet is mounted in position to be operated by the animal to be trapped.

7. An animal trap comprising a cell; a pair of trap doors therefor geared together; motor means for rocking them to cause them to descend simultaneously at their proximate edges to open a gap between them into the cell; a catch for locking them at horizontal closed position; an electro magnet for releasing the catch mounted on one of the doors; an electric generator and circuit for energizing the magnet mounted on the same door, and a circuit closer in said circuit mounted on one of the trap doors in position to be operated by the animal to be trapped.

8. An animal trap comprising a cell; a trap door therefor; motor means for operating it for opening and closing; a catch for locking it in closed position; an electro magnet for releasing the catch; an electric generator and circuit for energizing the magnet, comprising a circuit closer mounted on the door in position to be operated by the animal to be trapped, the circuit comprising an automatic circuit making-and-breaking device having a gravity-operated circuit-closing piece and in position on the door to be tilted by the opening movement in direction to cause said gravity operated piece to move out of circuit-closing position.

9. An animal trap having a trap door which rotates from closed to open and around to closed position at each action; a catch which arrests it at closed position; electrically operated means for releasing the catch; an automatic circuit-closing-and-opening device in said circuit on the door comprising a gravity-operated circuit-closing piece, and so mounted as to be tilted by the opening movement of the door to cause said gravity piece to leave circuit-closing position.

10. An animal trap comprising a cell and a rotative trap door therefor; a catch for arresting its rotation at closed position; electrically-operated means for releasing the catch; an electric circuit for said means comprising a circuit closer on the trap door in position to be operated by the animal to be trapped, and an automatic circuit closer and breaker also mounted on the rotative door comprising a circuit-closing piece, and a track therefor positioned to cause the circuit-closing piece to leave circuit-closing position by centrifugal force during the rotation of the door.

In testimony whereof, I have hereunto set my hand, at Chicago, Illinois, this 24th day of August, A. D. 1906.

FRED R. BAKER.

Witnesses:
CHAS. S. BURTON,
M. GERTRUDE ADY.